Figure 4:
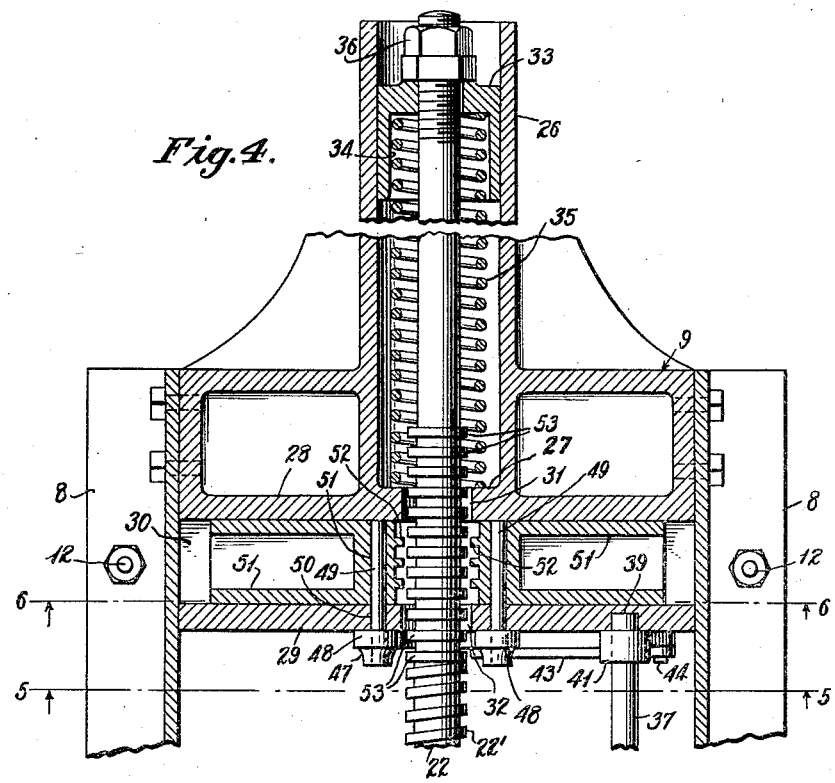

May 31, 1932.  J. REID  1,861,133
BELT TIGHTENER AND GUIDE
Filed Dec. 27, 1929  3 Sheets-Sheet 1
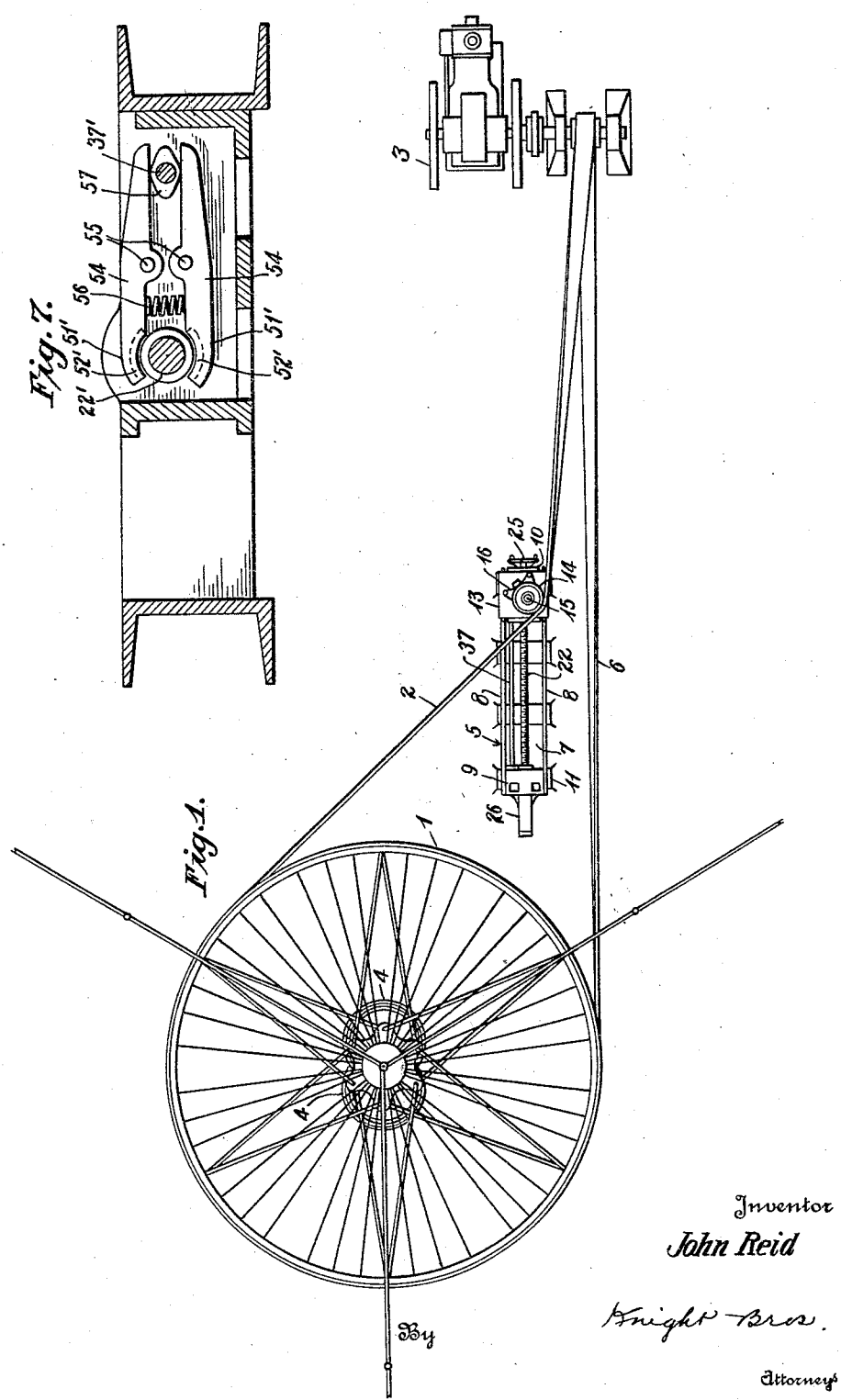
Inventor
John Reid
By Knight Bros.
Attorneys

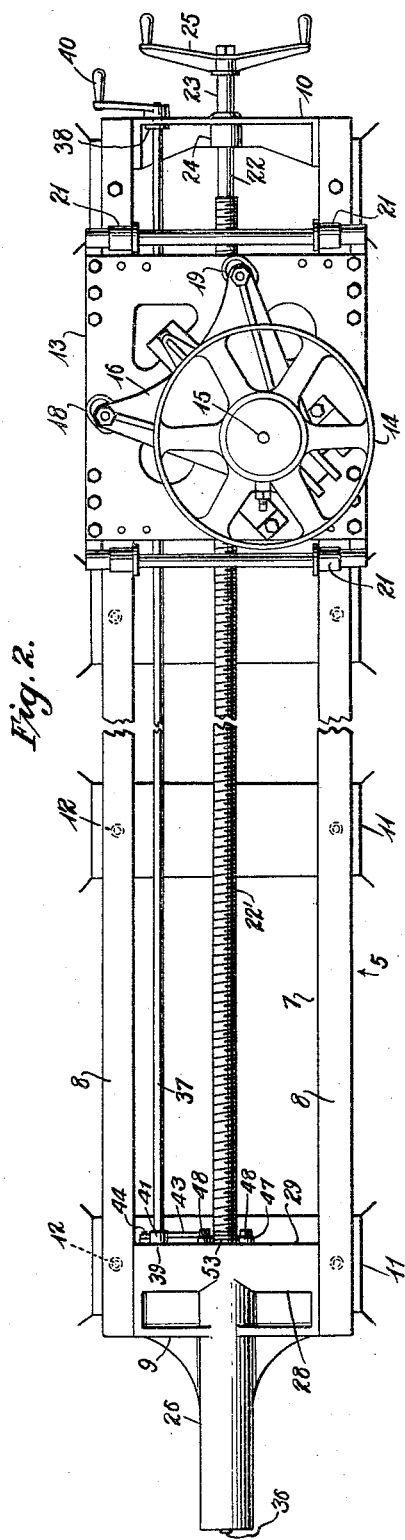

Inventor
John Reid
By Knight Bros.
Attorneys

Patented May 31, 1932

1,861,133

UNITED STATES PATENT OFFICE

JOHN REID, OF OIL CITY, PENNSYLVANIA

BELT TIGHTENER AND GUIDE

Application filed December 27, 1929. Serial No. 416,973.

This invention relates to a belt tightener particularly for use on a band wheel power belt. The device is designed for use on powers which drive eccentrics to which devices for driving the pumps of oil wells are attached. It has been the practice for a number of years to use manual belt tighteners or idlers on such belts. The travel of these idlers has been from three to ten feet. In normal use one eccentric usually has more wells to drive than another, which causes an alternate slackening and tightening of the belt. When endless belts were used, it became desirable to provide automatic means for compensating for this periodic change in slack and yet allow the full travel of the idler. This has been accomplished in the past by systems of weights and pulleys. These devices introduced several difficulties. When the belt flopped, the idler would rebound and travel back too far. When it was returned under the action of the weights, the idler would strike the belt a severe blow which would usually place a pressure on the belt beyond the safe working stress. When the belt broke, the weights would drag the idler the full length of its travel at a rapid rate which would put a severe strain on the device and endanger workmen in the vicinity.

An object of my invention is to provide a belt tightener which shall automatically take up normal variations in slack and which shall be able to be adjusted for the usual full length of travel.

A further object is to provide such a belt tightener that shall not overtravel upon sudden increases in belt tension such as those due to flopping of the belt.

A further object is to limit the travel of the device upon breakage of the belt.

A further object is to provide means for selectively rendering the automatic take up operative or inoperative.

Other objects will be apparent to those skilled in the art from the following description and appended claims.

In the drawings accompanying the description

Figure 5:
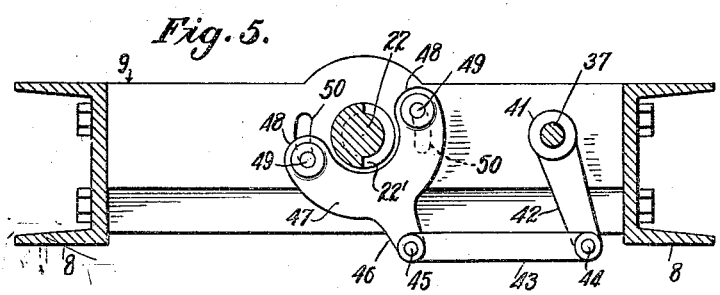
Figure 6:
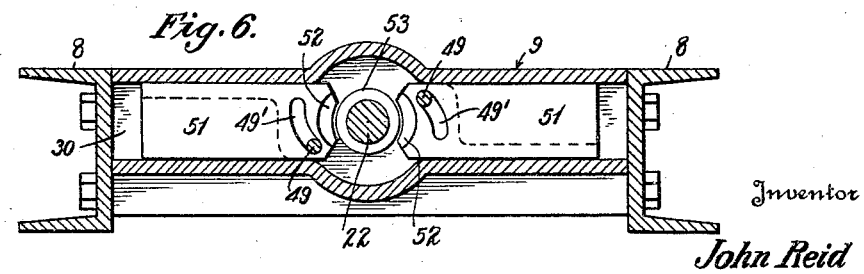

Fig. 1 is a plan view of one illustrative form of my device in operative relationship with the driving belt of a power, Fig. 2 is a plan view of the belt tightener assembly, Fig. 3 is an elevation of the device shown in Fig. 2, Fig. 4 is a horizontal section of the automatic take up device, Fig. 5 is a section taken along line 5—5 of Fig. 4 showing the means for rendering the take up device operative or inoperative, Fig. 6 is a section taken along line 6—6 of Fig. 4, and Fig. 7 is a section similar to that shown in Fig. 6 but which shows an alternative construction of the means therein shown.

The pumping power 1 is of the bandwheel type and is driven by the endless belt 2 from the prime mover 3, which may be an internal combustion engine. The eccentrics 4 are driven by the power 1 and to said eccentrics are attached the driving elements (not shown) for various pumping devices. The belt tightener 5 is placed against the slack side of the belt 2, preferably with its direction of travel parallel to the tight side 6 of the belt.

The belt tightener 5 includes a frame 7. This frame is made of two ship channels 8, which are held rigid and in alinement by cross braces 9 and 10, one at each end of said frame. The frame is securely bolted to the foundation 11 by bolts 12. This foundation preferably consists of concrete blocks firmly set in the floor at the desired location. The idler mechanism includes a carriage 13 carrying the idler pulley 14. The pulley 14 is carried by a shaft 15 which in turn is mounted on the device 16 which is securely fastened to the carriage 13 at 17, but which is angularly adjustable with respect to the carriage by the two set screws, 18 and 19. Jam nuts 20 prevent screws 18 and 19 from turning after an adjustment has been made. The entire carriage 13 is adapted to move along the tops of the channels 8 on the rollers 21. The carriage 13 is moved along the frame by means of the feed shaft 22, which is provided with threads 22' which engage threads on the carriage 13 at 13'. One end 23 of said feed shaft is journaled in the brace 10 at 24, and is free to rotate and move longitudinally therein. A crank 25 is provided to actuate said feed shaft in order to adjust the carriage 13. The opposite end of said feed shaft passes into the brace 9 as will now be described.

Referring to Fig. 4 it will be seen that brace 9 includes a tubular extension 26, having a shoulder 27 at the inner end thereof. Member 9 is also provided with two walls 28 and 29 forming a transverse chamber 30 between them. The walls 28 and 29 have openings 31 and 32 respectively in them, through which the feed shaft 22 passes freely. A collar 33 is made to fit snugly into the interior of the tubular member 26, and has a recess 34 for the reception of a spring 35. Collar 33 passes freely over the end of shaft 22, and is kept from slipping off by the nut 36 threaded onto the end of said shaft. It can be seen that spring 35 is confined between the shoulder 27 and the collar 33.

Shaft 37 is journaled at opposite ends in brace 10 and wall 29 of brace 9 at 38 and 39 respectively. A crank 40 is provided on one end of said shaft to actuate it. A collar 41 is securely fastened to shaft 37. Arm 42 is formed integral with said collar. A link 43 is pivotally connected at 44 to arm 42 and at 45 to projection 46, forming part of the actuating member 47. Member 47 carries two arcuate arms 48 which are concentric with and extend approximately half way around the shaft 22, but which allow said shaft to pass freely between said arms. In the outer end of each arm 48 is securely fastened a pin 49, passing through an arcuate slot 50 concentric with said shaft 22, said slots being provided in the wall 29. Two jaws 51 are fitted into the chamber 30, one on either side of member 22. Each of these jaws 51 has arcuate slots 52 adapted to engage with the projecting rings 53 formed integral with feed shaft 22, when slides 51 are moved toward said feed screw 22. These rings extend for a short distance beyond each of the walls 28 and 29. The pins 49 engage with the slots 49' in the jaws 51. These slots are eccentric with the axis of the feed shaft 22 and the arms of the actuating device 47. Thus upon rotation of the device 47 in a clockwise direction in Fig. 6, the jaws 51 will move toward the feed screw 22, while upon rotation in a counter clockwise direction the jaws 51 will move away from feed screw 22.

The operation of the device is as follows. The pulley is brought against the belt by turning the crank 25. The spring 35 is put under the desired compression by turning the crank 25 after the pulley is in contact with the belt. The set screws 18 and 19 may be changed if necessary to cause the belt to engage pulley 14 throughout the width of the belt. The spring 35 being under compression will, through its reaction upon collar 33, tend to move the carriage to the left as the device appears in Fig. 1. Thus if slack occurs in the belt 6, the spring 35 will cause the pulley to take up such slack. The spring 35 is so designed that it can be put under sufficient compression to take care of all ordinary slack.

If the belt should break, the spring 35 will merely expand to its fullest extent, which will cause the carriage to move only a short distance beyond its previous position, no great shock being imparted to the mechanism.

Upon the occurrence of a flopping of the belt, the spring 35 will be placed under a constantly increasing compression, which will not only prevent the idler pulley from overtraveling, but will also exert a snubbing action on the belt. Thus upon the return of the belt to its normal position the idler pulley, having closely followed the belt, will not exert any undue strains on the belt.

In some instances it may be desirable to render the automatic take up device inoperative. In that case, the crank 40 is turned so as to operate the shaft 37 in a clockwise direction which, through the arm 42 and link 43, will likewise turn the actuating member 47 in a clockwise direction, moving the slots 52 into engagement with the rings 53. This will lock the feed screw 22 against longitudinal motion. However, the feed shaft 22 is free to turn and the carriage 13 may still be adjusted along the frame by means of the crank 25. It can be seen that this locking can occur whether the spring 35 is under compression or not. This is due to the fact that the rings 53 are provided over a distance at least equal to the maximum distance through which the screw 22 can move under the influence of the spring 35. Thus there will always be some rings with which the slots 52 can engage. By turning the shaft 37 in a counter clockwise direction, the jaws 51 will be retracted and the automatic take up device again rendered operative.

In Fig. 7, which shows an alternative locking device, 22' indicates the feed screw with the rings cooperating with the slots 52' in the jaws 51', which are formed on the ends of the levers 54. Each of the levers 54 is pivoted at 55 to the frame. A spring 56 biases the levers 54 so that the slots 52' normally are out of engagement with the feed screw 22', allowing longitudinal movement thereof as described in connection with the first modification. The shaft 37' carries a double cam 57, which is placed between the ends of the levers on the side of the pivot points 55 opposite the spring 56. The figure illustrates the normal position. If the shaft 37' is turned in either direction from the position shown, each of the cam faces will move one of the lever arms against the action of the spring 56 and force the jaws 51' into engagement with the feed shaft 22. This locks feed shaft 22 against longitudinal movement as described in connection with the other modification.

Various changes may be made in the illustrated form of my invention within the scope of the appended claims.

Having described my invention, I claim:—

1. In a belt tightener, a guide frame, an idler pulley adapted to bear against the slack side of a driving belt, a feed screw for adjusting said pulley along said frame, spring means for pressing said pulley against said belt, and means for selectively rendering said spring means operative or inoperative.

2. In a belt tightener, a feed screw, an idler pulley carried by said feed screw, a guide frame, a spring interposed between said guide frame and said feed screw, a pair of movable jaws in said guide frame, cooperating rings and grooves on said feed screw and said movable jaws, and means for moving said jaws into or out of engagement with said feed screw.

3. In a belt tightener, a feed screw, an idler pulley carried by said feed screw, a guide frame, a spring interposed between said guide frame and said feed screw, a pair of movable jaws in said guide frame, cooperating rings and grooves on said feed screw and said movable jaws, and means for moving said jaws into or out of engagement with said feed screw, comprising a rotatable actuating member, pins carried by said member, slots in said jaws, said slots being eccentric to the axis of said actuating member, said pins being received in said slots, and means to selectively rotate said actuating means in one direction or the other.

4. In a belt tightener, a feed screw, an idler pulley carried by said feed screw, a guide frame, a spring interposed between said guide frame and said feed screw, a pair of pivoted jaws in said guide frame, cooperating rings and grooves on said feed screw and said pivoted jaws, and means for moving said jaws into or out of engagement with said feed screw, said means comprising a rotatable actuating member, and a double cam mounted upon said member cooperating with said pivoted jaws.

The foregoing specification signed at Oil City, Penna., this 24th day of December, 1929.

JOHN REID.